May 5, 1925.
E. V. HAGMAN
1,537,009
SPEED INCREASING DEVICE
Filed April 12, 1921   3 Sheets-Sheet 1
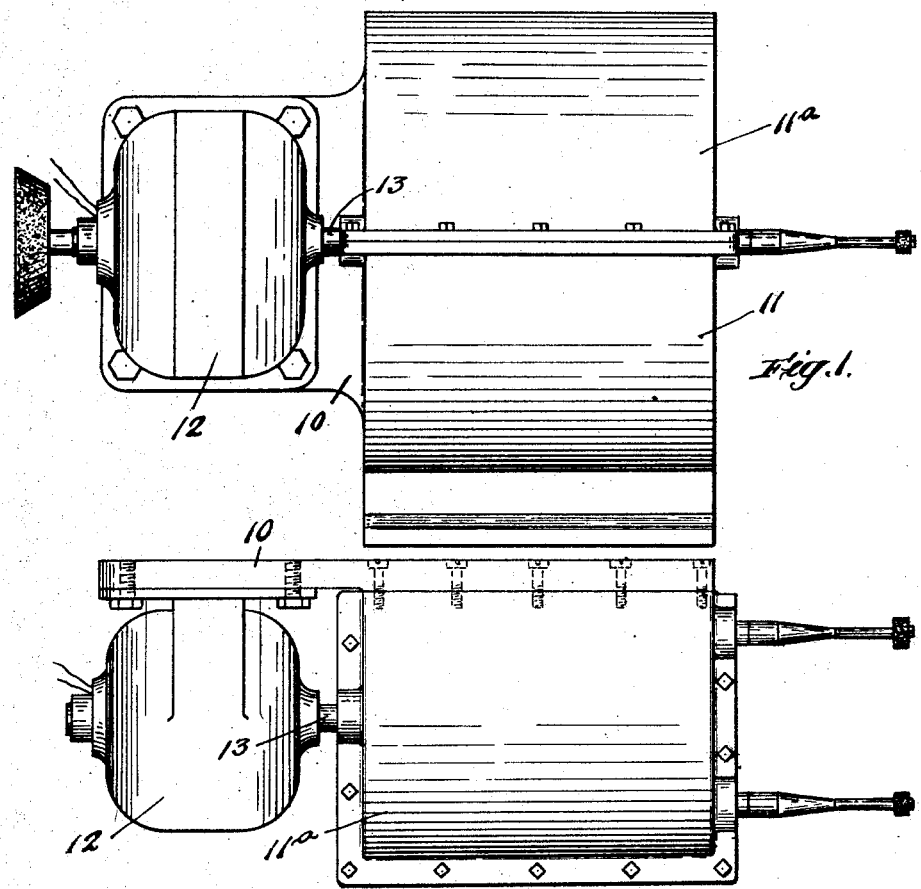
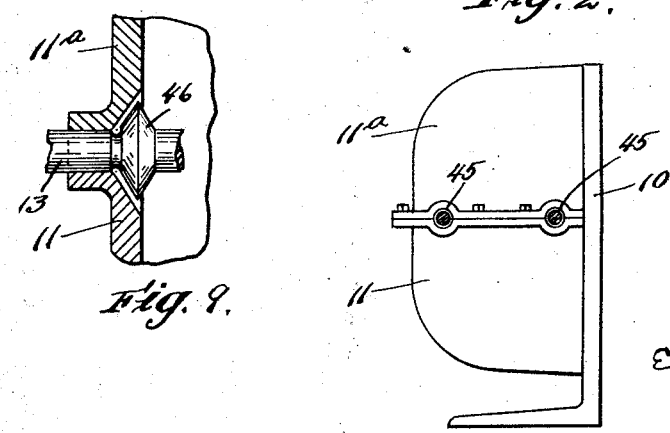
Inventor.
Edwin V. Hagman
by
atty May 5, 1925.　　　　　　　　　　　　　　　　1,537,009
E. V. HAGMAN
SPEED INCREASING DEVICE
Filed April 12, 1921　　　　3 Sheets-Sheet 2

Inventor,
Edwin V. Hagman
by
T. T. ——
atty

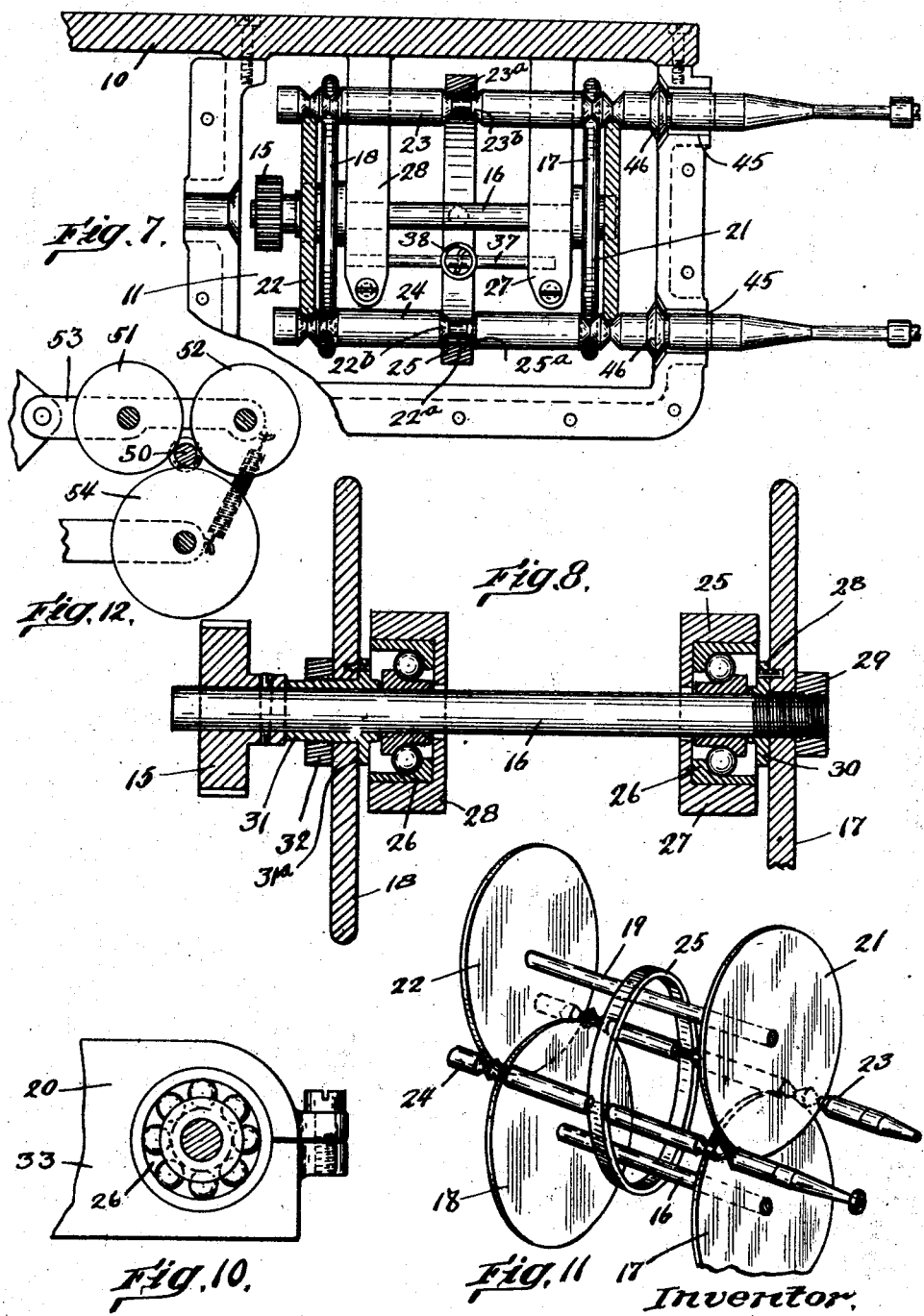

Patented May 5, 1925.

1,537,009

UNITED STATES PATENT OFFICE.

EDWIN V. HAGMAN, OF WATERTOWN, MASSACHUSETTS.

SPEED-INCREASING DEVICE.

Application filed April 12, 1921. Serial No. 460,793.

*To all whom it may concern:*

Be it known that I, EDWIN V. HAGMAN, a citizen of the United States, residing at Watertown, in the county of Middlesex and State of Massachusetts, have invented an Improvement in Speed-Increasing Devices, of which the following is a specification.

This invention relates to speed increasing devices and has reference to a speed increasing device particularly adapted for use in connection with the finishing of surfaces by grinding and especially for internal grinding, although well adapted for other purposes.

The finishing of surfaces with the use of small cutting wheels presents unusual difficulties by reason of the high rotative speed at which the wheels should be driven for rapid cutting action and the necessity for holding the wheel and the shaft which bears it firmly against vibration in order that the full peripheral surface of the wheel may engage the work and thereby expedite the grinding or cutting action.

The usual type of grinder comprises a shaft adapted to receive the cutting wheel and mounted in fixed supporting bearings; and the speed increasing and shaft driving means includes usually a plurality of pulleys and belts or the equivalent. The shaft must be an exceedingly close fit in its bearings in order to rotate without transverse vibration. In addition to the difficulty of initially obtaining and subsequently maintaining such close fits, the high rotative speed of the shaft, which is adapted to revolve at from fifty thousand to one hundred thousand revolutions per minute, or even higher, brings lubrication and heating troubles into prominence. Furthermore, the speed-increasing mechanism usually is bulky and consumes a considerable amount of power.

An object of this invention is a speed-increasing device, especially adapted for grinders, wherein the driven or high speed shaft is firmly rotatably supported without tendency to side play and vibration; and the speed increasing means is relatively simple, compact and efficient.

The device embodying the invention may have the driven shaft driven and supported by rotatable elements of the speed-increasing mechanism. The driven shaft may be supported by and between two sets of discs of relatively large diameter as contrasted with the driven shaft; and one or more of said discs may be connected with and rotated by a driving shaft while others of said discs may be loosely rotatably supported and be driven by the driven shaft. The driven shaft may be rotatably supported rigidly by the driving and loose discs which constitute the sole supporting means for said shaft.

A further object is generally to improve the construction and operation of speed-increasing devices and grinders.

Fig. 1 is a side elevation of a grinder embodying the invention.

Fig. 2 is a plan view of the grinder.

Fig. 3 is an end view of the grinder.

Fig. 7 is a section along line 7—7 of Fig. 6.

Fig. 8 is a section along the axis of the driving shaft.

Fig. 9 is a detail of an oil guard disc herein applied particularly to the motor shaft.

Fig. 10 is a side view, in enlarged detail of a driving shaft bearing.

Fig. 11 is a perspective view of the elements of the speed-increasing mechanism.

Fig. 12 is a diagrammatic representation of modified means for driving and supporting the driven shaft.

Figure 5:
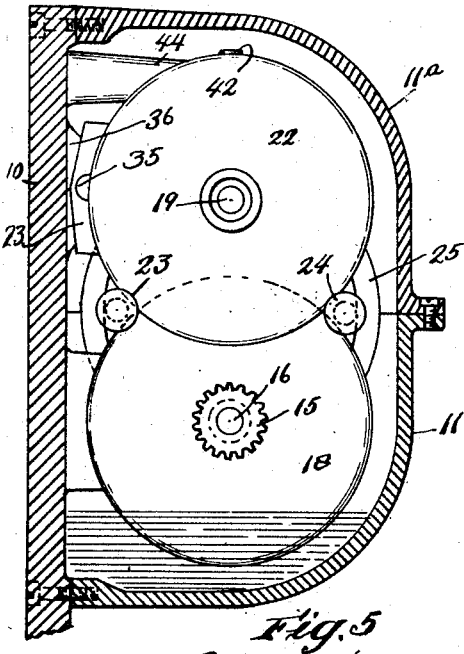
Fig. 5 is a section taken along line 5—5 of Fig. 4 with the casing in place but with the driving motor and its gear removed.
Figure 6:
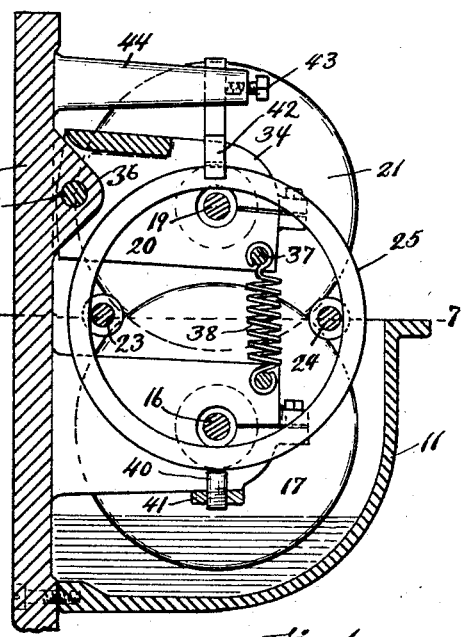
Fig. 6 is a section taken along line 6—6 of Fig. 4 with one of the covers of the casing removed.
Figure 4:
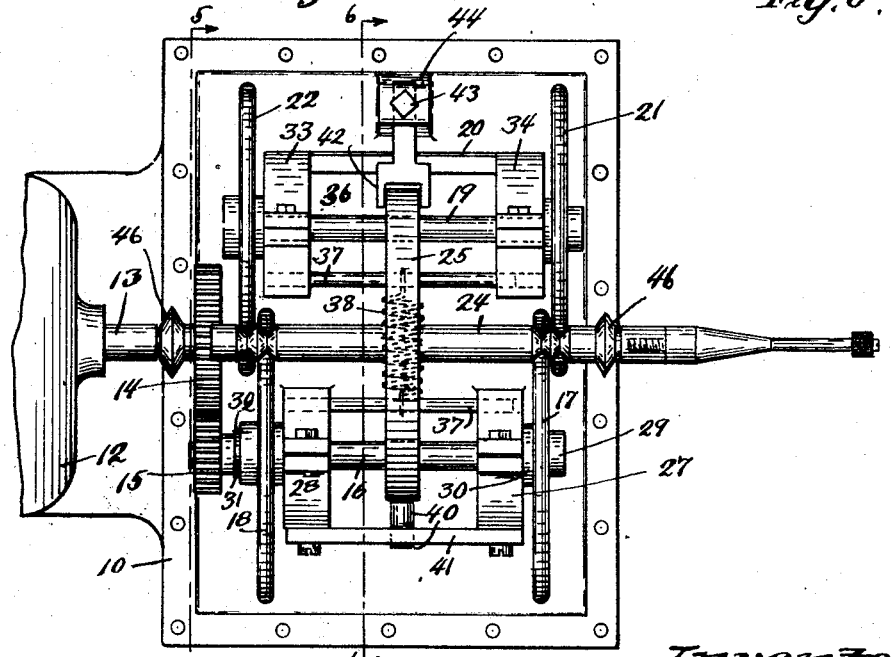
Fig. 4 is a side view of the mechanism with the case removed.

As here shown, the speed increasing mechanism is adapted for use as a grinder and is supported on a base 10 and enclosed within the two part cover 11 and 11ª which is removably secured to the base and is adapted to contain oil by which the rotative components of the mechanism are lubricated. An electric motor 12 is supported on said base without the casing and has its shaft 13 extended therein and provided with a gear 14 which meshes with a pinion gear 15 secured to the driving shaft 16, whereby the speed of the motor is increased in the driving shaft. For some purposes it may be desirable to connect the motor shaft directly to the driving shaft and thereby eliminate the gears and this will be desirable when a suitably high speed motor is used.

The elements of the speed-increasing mechanism include the driving shaft 16; the friction discs 17 and 18, mounted on the ends of said shaft; the shaft 19, mounted in the spring-controlled pivoted bracket 20; the friction discs 21 and 22, mounted on said shaft 19 and overlapping said discs 17 and 18; the driven shafts 23 and 24, supported between said discs; and the ring 25 against the inner face of which said shafts bear rotatably.

The driving shaft 16 is rotatably supported in bearings, here shown as ball bearings 26, supported in the split standards 27 and 28 extended from the base 10; and said bearings are arranged to restrain said shaft from axial movement whereby to restrain the driven shaft from axial movement as will be evident from the construction hereinafter to be described. Said disc 17 is fixed to one end of said shaft by suitable means as the two nuts 29 and 30 which are threaded on said shaft and between which said disc is clamped; and said disc constitutes the driving disc for the driven shafts. Said disc 18 is of substantially the same diameter as said driving disc 17 and, preferably, is loosely mounted on said shaft and for this purpose may be secured on the sleeve 31 which is rotatably supported on said shaft; and said disc is clamped between the shoulder 31ª of said sleeve and the nut 32 threaded on said sleeve. Said shaft 19 is rotatably supported in, preferably, ball bearings similar to said bearings 26 and arranged in arms 33 and 34 of said bracket 20; and said bracket is pivoted on pin 35 carried by a lug 36 extended from the face of the base 10. A rod 37 extends between said arms 33 and 34 and a similar rod extends between the fixed standards 27 and 28. A tensile spring 38 is connected between said rods and tends to move said bracket 20 about its pivot toward the driving shaft for a purpose hereinafter to be set forth. Said disc 21 is preferably fixed to one end of said shaft 19 and in the same way that said driving disc 17 is fixed to the driving shaft 16; and said disc 22 is preferably rotatably supported on the end of said shaft 19 and in the same way that said disc 18 is rotatably supported on shaft 16. It is desirable that the discs be of equal diameter but the above described method of mounting the discs provides for slight variations in diameter as will be hereinafter set forth.

It will be noted that said disc 21 is spaced adjacent and overlaps the disc 17; and that said disc 22 is spaced adjacent and overlaps the disc 18. Said discs constitute the supporting means for the driven shaft. Preferably, the peripheries of said discs are semicircular in shape and are received within corresponding grooves in the driven shafts 23 and 24 by which the shafts are held against axial movement and good driving engagement between said discs and shafts is obtained. Obviously, however, the discs and shafts may be otherwise arranged for the same purpose.

The rotatable ring 25 disposed between the friction discs serves to hold the driven shafts 23 and 24 in rolling engagement with said discs and for this purpose is disposed over or encircles and is adapted to engage and support and be rotated by said shafts. While the inner or driven-shaft-engaging face of said ring may be made as a plane face the inner edges thereof are preferably chamfered to form curved bearing faces 25ª; and the shafts are preferably formed with the grooves 22ª and 23ª having the tapered sidewalls 22ᵇ and 23ᵇ against which the faces 25ª of the ring bear rotatably. Said grooves serve to hold the ring axially in place.

The spring 38 tends to force the discs 21 and 22 toward the discs 17 and 18 carried by the driving shaft and thereby forces the driven shafts against the inner face of said ring 25; and said shafts will be held in place by said ring.

No supporting means for the driven shafts are needed other than said discs and ring and said shafts will be held rigidly in position.

It will be seen that the driving means, comprising said discs, is also the supporting means for the driven shafts, and as the shafts roll upon the supporting means, friction is practically eliminated and high rotative speeds of the driven shaft may be obtained. While all of the discs may serve as driving discs, unless all discs are of equal diameter, there will be slipping between one or more of the discs and the driven shafts, and, consequent heating. For this reason, preferably, but one of the discs, as 17, is the driving disc and the remaining discs are driven by the driving shaft. If the driving and driven discs vary in diameter, slippage will occur, not at the driven shafts, but at the shafts 16 and 24, and as both shafts and discs are rotating at practically the same angular speed, the friction losses will be negligible.

It will be noted that the ring 25 is driven by the driven shafts and at greatly reduced speed. Said ring is held against movement transverse the driven shafts by the adjustable screw 40 carried by the cross-bar 41 secured to the standards 27 and 28, and against tendency to rotate eccentrically by the forked member 42 adjustably secured by the set screw 43 in the post 44 rising from the base 10 and between the forks of which member said ring is rotatably received. It may be that but one shaft as 23 will be employed as the grinder shaft and said other shaft 24 may then serve merely as an idler shaft to support said ring 25 against pressure of the driven shaft 23 against it caused by the spring 38.

Said driven shafts extend through apertures 45 in the casing and said apertures are preferably substantially larger than the shafts to avoid any rubbing contact therebetween.

The shafts may be provided with the oil guard discs 46 adjacent said apertures which serve to reduce the probability of loss of oil from the casing through the apertures.

A modified form of driven shaft supporting and driving means is illustrated diagrammatically in Fig. 12. As here shown, the driven shaft 50 is supported between the idler discs 51 and 52, which are rotatably supported on the pivoted spring-pressed arm 53, and the driving disc 54. In this arrangement the discs themselves fully support the shaft and the ring 25 may be omitted.

It will be noted that the construction above set forth provides means rotatably to support the driven shafts at three points so spaced about the periphery of the shafts that said shafts are rotatably held firmly in position.

With the constructions above set forth it will be noted that only those parts rotating at a relatively slow rate of speed are in rubbing contact with stationary supporting bearing members and the friction losses are consequently low. Speeds of considerable magnitude may be attained in this device and the driven shaft rotated without vibration.

The speed changing mechanism herein described may also be used as a speed reducing mechanism.

While I have herein shown and described the driven shaft driving and supporting discs as "overlapping", yet they need not be so arranged. While the overlapping discs result in a more compact arrangement of the mechanism, and the arrangement is therefore desirable, yet the discs may be disposed with their peripheries close to each other, as illustrated in Fig. 12, and not overlapping and support the driven shaft effectively, and in accordance with my invention.

It will be noted that the sets of discs and the ring, or its equivalent, and the spring constitute supporting means for the driven shaft which is automatically adjustable for wear and will maintain the shaft rigidly rotatably supported regardless of wear between the discs and shaft or at other parts.

It is obvious that the invention may be embodied in modified structures without departing from the spirit thereof.

I claim:

1. Speed increasing mechanism including the combination of a driving shaft, means to support said shaft for rotation about a fixed axis, a driven shaft, spaced duplicate sets of rotatable speed-increasing means connecting said shafts and means cooperating with said sets rotatably to engage and support said driven shaft in position against displacement and serve as the sole supporting means for said driven shaft, certain of said speed-increasing means having means to urge them constantly into engagement with said driven shaft.

2. Speed increasing mechanism including the combination of a driving shaft, means to support said shaft for rotation about a fixed axis, a driven shaft, and speed-increasing means including spaced discs carried by said driving shaft arranged in frictional driving engagement with said driven shaft, said speed-increasing means also including rotatable supporting means including other spaced discs arranged to cooperate with the discs of said driving shaft to engage and support said driven shaft at such points about its periphery as to rotatably support said shaft in position for rotation about a fixed axis, certain of said speed-increasing means having means to urge them constantly into engagement with said driven shaft.

3. Speed-changing mechanism comprising the combination of a driving shaft, a driven shaft, means to support the driving shaft for rotation about a fixed axis, and driving means connecting said shafts comprising spaced discs carried by the driving shaft arranged in frictional driving engagement with the driven shaft and rotatable means including a yielding member arranged to support and hold the driven shaft in fixed position and in driving engagement with said discs.

4. Speed increasing mechanism including the combination of a driving shaft rotatable about a fixed axis, a set of friction discs mounted thereon, a yieldingly supported shaft, a set of friction discs mounted on said shaft, a driven shaft rotatably supported on said sets of discs whereby it is supported and driven at increased speed and rotatable means in engagement with said driven shaft arranged to hold it in driving engagement with said sets of discs.

5. Speed increasing mechanism including a driving shaft, a set of friction discs mounted thereon, a driven shaft engaging the periphery of said set of discs, and means rotatably to support said driven shaft in engagement with said friction discs including a second shaft, a set of friction discs mounted thereon and rotatably engaging said driven shaft, a second driven shaft rotatably supported on and by both sets of discs, and a ring disposed between said sets of discs rotatably engaging said driven shafts on its inner face.

6. Speed increasing mechanism including a driving shaft, a set of friction discs mounted thereon, a second shaft, a set of friction discs mounted on said second shaft overlapping the discs of the first set, means to move said second shaft toward said driving shaft, two driven shafts rotatably supported on the peripheries of both sets of discs, and a ring encircling both driven shafts between said discs arranged rotatably to support said shafts in engagement with said discs.

7. Speed increasing mechanism including a driving shaft, a set of friction discs mounted thereon, a pivoted bracket, a second shaft rotatably carried by said bracket, a set of friction discs mounted on said second shaft overlapping said first set of discs, two driven shafts rotatably supported on the peripheries of both sets of discs, a ring encircling both driven shafts between said discs arranged rotatably to support said shafts; and resilient means to press said second shaft toward said driving shaft and said driven shafts against the inner face of said ring.

8. Speed increasing mechanism including a driving shaft, a set of friction discs mounted thereon, a pivoted bracket, a second shaft rotatably carried by said bracket, a set of friction discs mounted on said second shaft overlapping said first set of discs, two driven shafts rotatably supported on the peripheries of both sets of discs, a ring encircling both driven shafts between said discs arranged rotatably to support said shafts, resilient means to press said second shaft toward said driving shaft and said driven shafts against the inner face of said ring, and supporting means for said ring.

9. Speed increasing mechanism including a driving shaft, a friction disc fixed thereto, a second friction disc rotatably mounted thereon, a second rotatably supported shaft arranged for movement toward said driving shaft, a friction disc fixed to said second shaft overlapping one of the discs on said driving shaft, a second disc rotatably mounted on said second shaft overlapping the other disc of said driving shaft, two driven shafts rotatably supported on and by said friction discs, a ring encircling said driven shafts between said discs and rotatable thereon, and resilient means to press said second shaft toward said driving shaft and said driven shaft into rotatable engagement with the peripheries of said discs and the inner face of said ring.

10. Speed changing mechanism including a driving shaft means to support said shaft to rotate about a fixed axis, two discs carried by said shaft, a driven shaft disposed in driving engagement with said discs, and driven shaft supporting means including rotatable elements comprising cooperating discs and a ring arranged to engage said driven shaft rotatably on opposite sides of a line passed through the center of said driving and driven shafts whereby to support said driven shaft against disengagement from driving engagement with said driving discs and resilient means to press said rotatable elements against said driven shaft.

11. Speed changing mechanism including a driving shaft, friction discs carried thereby, a second shaft, a set of friction discs mounted on said second shaft, a driven shaft rotatably supported on said sets of discs whereby it is supported and driven, rotatable means including a ring internally in engagement with said driven shaft arranged to hold it in driving engagement with said sets of discs and resilient means to press said sets of discs and rotatable means into contact with said driven shaft.

12. Speed changing mechanism including the combination of a driving shaft rotatable about a fixed axis, a driven shaft arranged in frictional driven engagement with said driving shaft, and rotatable means to support said driven shaft in rotatable engagement with said driving shaft about a fixed axis including spaced discs in engagement with said driven shaft and a ring having its inner face in engagement with said driven shaft.

13. Speed increasing mechanism including the combination of two parallel shafts disposed side by side and each provided with a plurality of driving means, two free driven shafts each arranged side by side between and in rotatable engagement with the driving means of both parallel shafts, and rotatable means engaging said driven shafts to hold them in such relation, said rotatable means and parallel shafts constituting the supporting means for said two driven shafts.

14. Speed increasing mechanism including the combination of two parallel shafts disposed side by side and each provided with a plurality of driving means, two free driven shafts each arranged side by side between and in rotatable engagement with the driving means of both parallel shafts, and rotatable means engaging said driven shafts to hold them in such relation including a ring encircling all shafts and having its inner face in rolling engagement with said driven shafts, said ring and parallel shafts constituting the supporting means for said two driven shafts.

15. Speed increasing mechanism including the combination of a driving shaft, a second shaft, two driven shafts arranged in rotatable engagement with said driving and second shafts, and means to hold said driven shafts in such relation including a ring having its inner face in engagement with said driven shaft and means to bias said second shaft toward said driving shaft.

16. Speed increasing mechanism including the combination of a driving shaft, a second shaft, a driven shaft in engagement with said shafts, means to hold said driven shaft in such relation including a ring having its inner face in engagement with said driven shaft, and yielding means to hold said ring in such engagement.

17. Speed increasing mechanism including the combination of a driving shaft, a second shaft, a driven shaft in engagement with said shafts, means to hold said driven shaft in such relation including said driving and second shafts and a ring having its inner face in engagement with said driven shaft, and means to hold said ring in such engagement comprising a second driven shaft arranged in engagement with the inner face of said ring and also in engagement with said driving and second shafts, said driving and second shafts and ring constituting the supporting means for said two driven shafts.

18. Speed increasing mechanism including the combination of a driving shaft, a second shaft, a driven shaft in engagement with said shafts, means to hold said driven shaft in such relation including a ring having its inner face in engagement with said driven shaft, and means to hold said ring in such engagement comprising a second driven shaft in engagement with the inner face of said ring and in engagement with said driving and second shafts, and means to urge said second shaft toward said driving shaft.

19. Speed increasing mechanism including a driving shaft, a set of friction discs mounted thereon, a driven shaft engaging the periphery of said set of discs, and means rotatably to support said driven shaft in engagement with said friction discs including a second shaft, a set of friction discs mounted thereon and rotatably engaging said driven shaft, a second driven shaft rotatably supported on and by both sets of discs, and a ring disposed to rotatably engage both driven shafts on its inner face.

20. Speed increasing mechanism including a driving shaft, a set of friction discs mounted thereon, a second shaft, a set of friction discs mounted on said second shaft overlapping the discs of the first set, means to move said second shaft toward said driving shaft, two driven shafts rotatably supported on the peripheries of both sets of discs, and means encircling both driven shafts arranged rotatably to support said shafts in engagement with said discs.

In testimony whereof, I have signed my name to this specification.

EDWIN V. HAGMAN.